May 7, 1946.  W. H. CLARK  2,399,854
COTTON CHOPPER
Filed Feb. 7, 1944   5 Sheets-Sheet 5
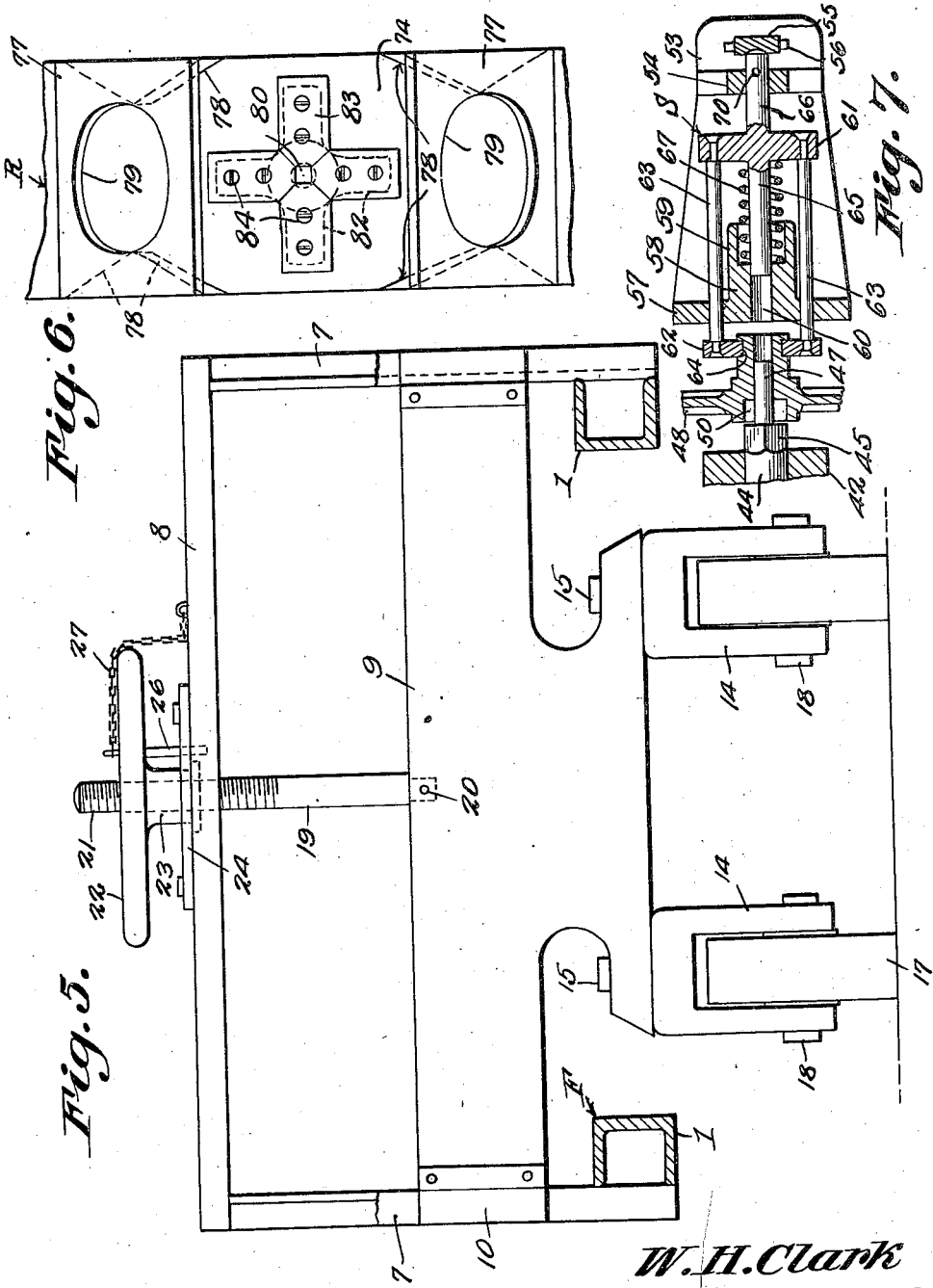
W. H. Clark
INVENTOR.
BY
ATTORNEYS.

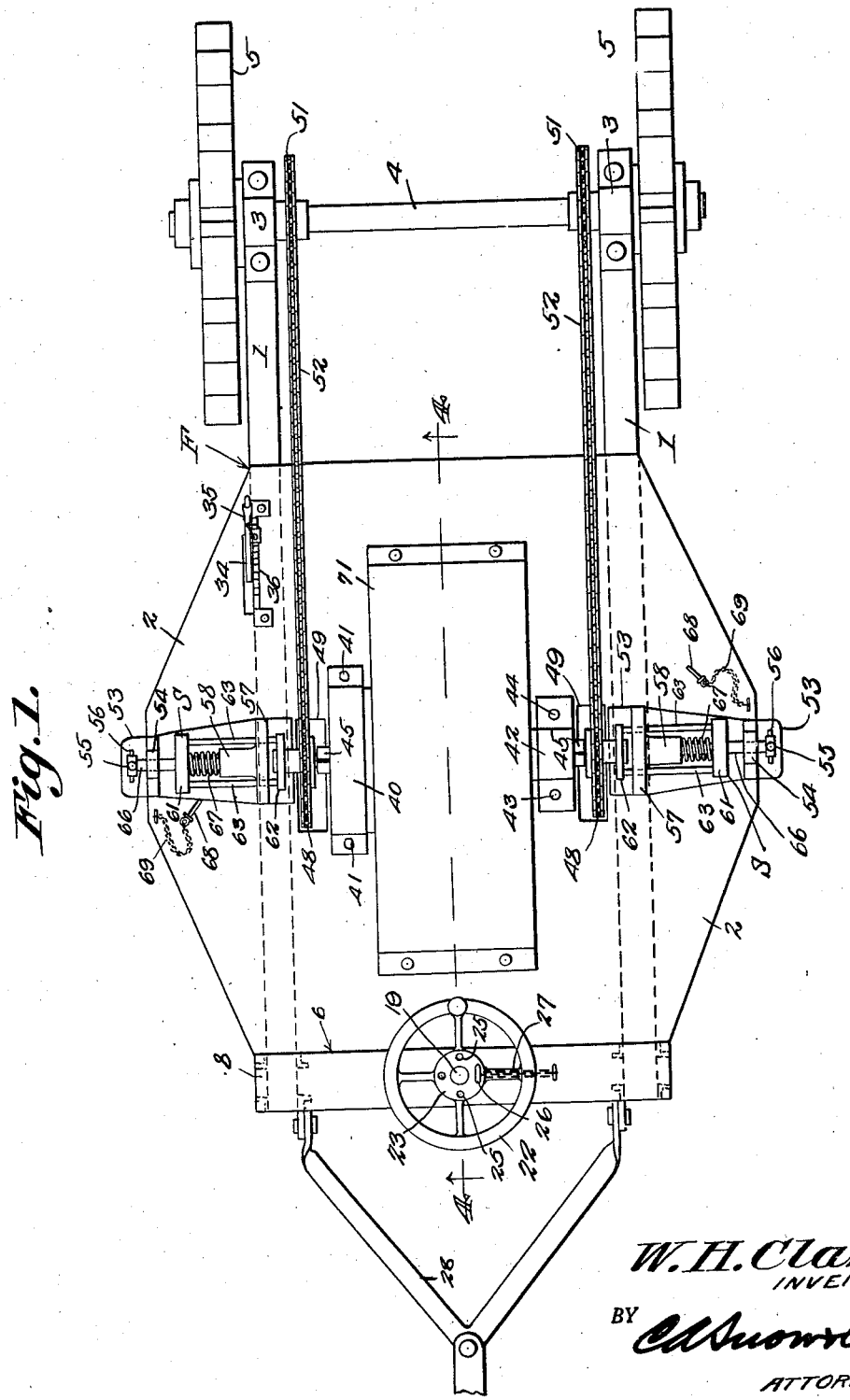

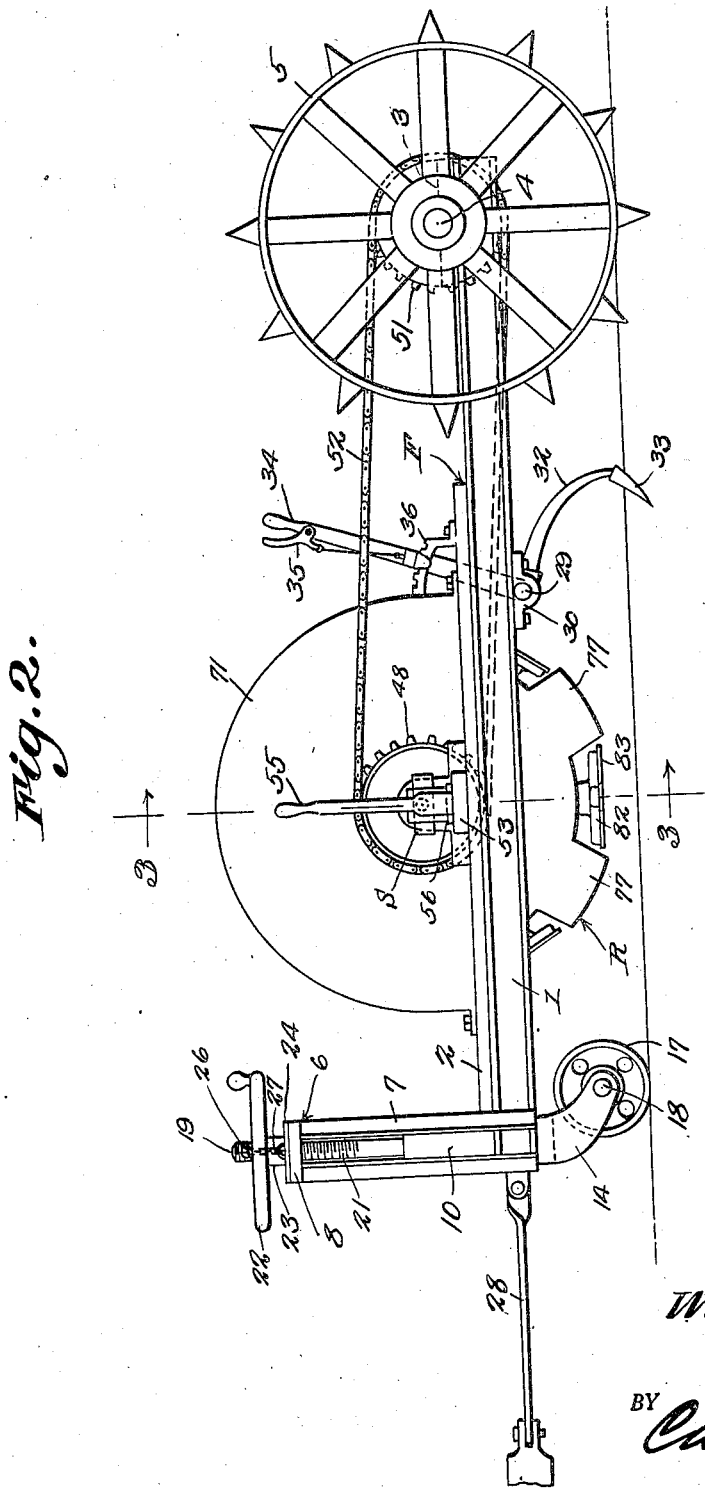

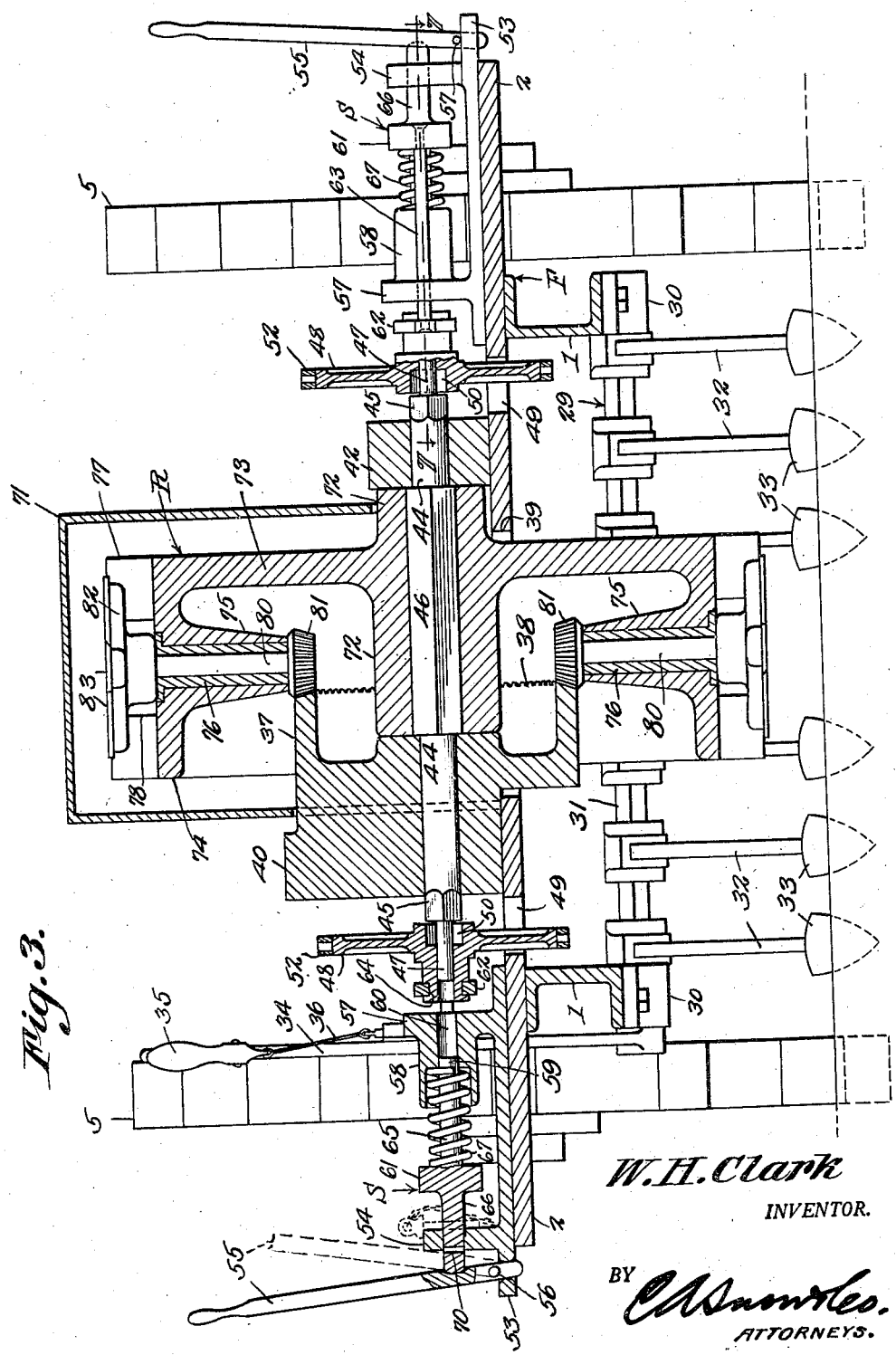

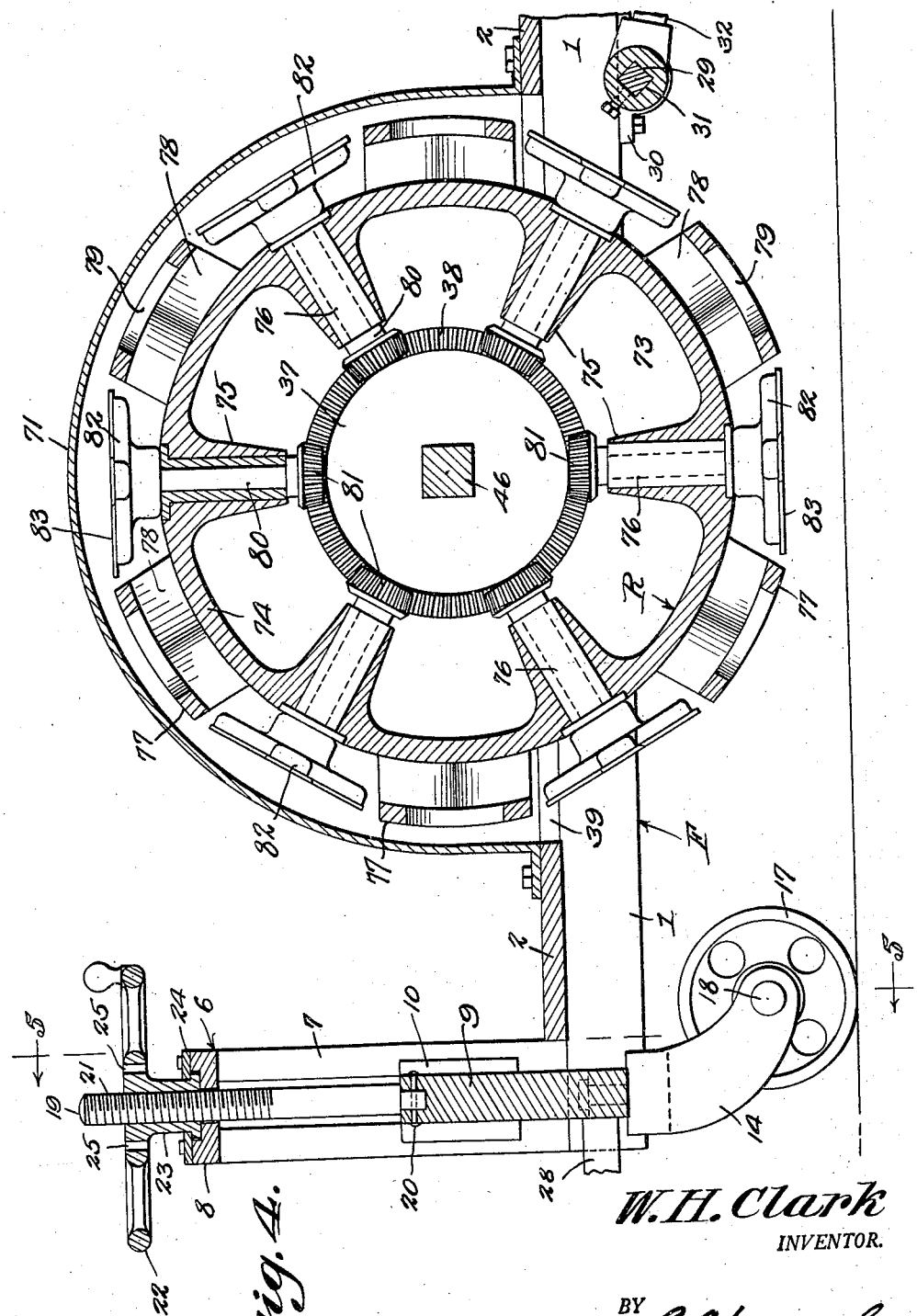

Patented May 7, 1946

2,399,854

UNITED STATES PATENT OFFICE 2,399,854

COTTON CHOPPER

William H. Clark, Riverside, Calif.

Application February 7, 1944, Serial No. 521,419

1 Claim. (Cl. 97—22)

The machine forming the subject matter of this application is adapted to be used for thinning or chopping out cotton. It comprises a rotor mounted to turn on a horizontal axis, and cutters mounted on the rotor, to turn on axes radial with respect to the rotor. The invention aims to provide novel means for imparting rotation to the cutters, and to supply novel means whereby the cutters may be made active or inactive at the will of an operator.

A further object of the invention is to provide novel means for adjusting the cotton chopping instrumentality with respect to the plant.

A further object of the invention is to supply a device of the class described, in which rotation may be imparted to the rotor, simultaneously, from opposite sides of it, the construction being such, nevertheless, that if one of the means for turning the rotor becomes inoperative, the other will do the work, although at a decreased efficiency.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in top plan, a cotton chopping device constructed in accordance with the invention;

Fig. 2 is a side elevation;

Fig. 3 is a transverse section on the line 3—3 of Fig. 2;

Fig. 4 is a longitudinal section on the line 4—4 of Fig. 1, rear parts being omitted;

Fig. 5 is a transverse section on the line 5—5 of Fig. 4;

Fig. 6 is a fragmental elevation showing a portion of the periphery of the rotor and associated parts;

Fig. 7 is a section on the line 7—7 of Fig. 3.

The device forming the subject matter of this application contemplates the use of a wheel-mounted vehicle, which can be made in various ways. As shown, but not of necessity, the frame F of the vehicle includes parallel, longitudinal rails 1, upon which is secured a platform 2, the platform section extending laterally beyond the rails 1, and the rails projecting rearwardly beyond the platform, as Fig. 1 shows.

As will be evident from Figs. 1 and 2, bearings 3 are secured to the upper edges of the rails 1, at the rear ends thereof. In the bearings 3, a transverse rear axle 4 is mounted for rotation, the axle being a driving axle. Peripherally-toothed rear ground wheels 5 are secured to the axle 4, outwardly of the rails 1, the said wheels being driving wheels for a chopping mechanism to be described hereinafter.

An inverted, U-shaped standard 6 is supplied (Fig. 5) and is made up of vertical, two-part guides 7 (Fig. 4), to the upper ends of which a crown-bar 8 is secured. The lower ends of the guides 7 are secured to the rails 1 of the frame F, and, as appears in Fig. 4, the platform 2 extends forwardly into abutment with the rear edges of the guides 7.

In Fig. 5, there appears a transverse carriage beam 9, supplied at its ends with shoes 10, cooperating with the guides 7 to mount the carriage beam for vertical adjustment. Forked yokes 14 are supplied and have headed stub shafts 15, mounted rotatably in the beam 9. Castor wheels 17 are supported at 18 for rotation in the yokes 14.

A mechanism is provided for raising and lowering the standard 6 at the will of an operator, to the end that the chopping means and the cultivator means, both to be described hereinafter, may be positioned properly with respect to the soil.

A stem 19 is disposed midway between the ends of the carriage beam 9, the lower end of the stem being secured at 20 (Fig. 5) to the carriage beam. The upper portion of the stem 19 is threaded, as at 21, to cooperate with a hand wheel 22. The hub 23 of the hand wheel 22 is held on the crown-bar 8 of the standard 6 by means of an anchor plate 24, the hand wheel thus being held for rotation on the crown-bar, the stem 19 passing upwardly through the crown-bar.

If the hand wheel 22 is rotated, a vertical adjustment of the frame F with respect to the surface of the soil will be secured, in a way that will be clear from an inspection of the drawings. Any suitable means may be supplied for holding the hand wheel 22 against accidental rotation. For example, the hub 23 of the hand wheel 22 may be supplied with circumferentially spaced seats 25 (Figs. 4 and 1), any of the seats being adapted to receive a pin 26 which extends downwardly into the crown-bar 8, the pin being connected to a flexible element 27, secured to the crown-bar.

A draft appliance 28 is secured to the forward ends of the rails 1, so that the machine may be drawn about by a tractor or animals.

Provision is made for cultivation, after the chopping operation has been accomplished, and, having that consideration in mind, the ends of a transverse shaft 29 are mounted to rock in bearings 30, secured to the lower edges of the rails 1, as Figs. 2 and 3 show. The shaft 29 includes a squared intermediate portion 31, on which are mounted depending, rearwardly extended goose necks 32, cultivator elements 33 being secured to the lower ends of the goose necks.

As a means for rotating the shaft 29 at the will of an operator, to raise or lower the cultivator elements 33, the shaft 29 is provided at one end with a hand lever 34, having a latch mechanism 35, adapted to cooperate with a segment 36 fixed to the platform 2.

The description, as thus far submitted, covers the means for wheel-mounting the vehicle on the surface of the soil and for adjusting the vehicle vertically with respect to the soil, together with the cultivator elements, and the means for mounting them for adjustment at the will of an operator, relatively to the surface of the soil and relatively to the frame of the vehicle. The chopping mechanism will next be set forth.

In Figs. 3 and 4, the numeral 37 marks a cup-shaped gear wheel, provided with teeth 38 on its inner edge, the gear wheel extending downwardly through an opening 39 in the platform 2. A substantial, laterally projecting anchor block 40 forms part of the gear wheel 37, and is secured to the platform 2. The gear wheel 37, therefore, is a fixed member. The means for securing the anchor block 40 to the platform 2 is shown at 41 in Fig. 1. A bearing 42 is disposed opposite to the anchor block 40, transversely of the machine, and is secured to the platform 2, as shown at 43 in Fig. 1.

A shaft 44 is disposed transversely of the machine and is journaled in the anchor block 40 and in the bearing 42, the shaft having polygonal ends 45, disposed outwardly of the anchor block and outwardly of the bearing, the shaft comprising a polygonal intermediate portion 46, disposed between the anchor block and the bearing, as Fig. 3 makes manifest.

The polygonal ends 45 of the shaft 44 are provided with outwardly projecting spindles 47, whereon sprocket wheels 48 are mounted to rotate, and to slide transversely of the machine. The sprocket wheels 48 extend downwardly through openings 49 in the platform 2, and are supplied with sockets 50, shaped to accommodate the polygonal end portions 45 of the shaft 44. A releasable clutch connection between the shaft 44 and the sprocket wheels 48 thus is provided.

Sprocket wheels 51 are secured to the driving or rear axle 4, the sprocket wheels 51 being connected with the sprocket wheels 48 by sprocket chains 52.

Duplicate mechanisms are supplied for moving the sprocket wheels 48 inwardly and outwardly, so that their sockets 50 may be engaged with and disengaged from the polygonal ends 45 of the shaft 44. Since duplication is present, the description will proceed in the singular number.

A bracket plate 53 is secured to the platform 2, outwardly of the sprocket wheel 48 (Figs. 3 and 7), and is supplied near its outer end with an upstanding arm 54. An upstanding lever 55 is supported at 56 for fulcrum movement in the bracket plate 53, outwardly of the arm 54.

The bracket plate 53 carries an upstanding, inner arm 57. A combined guide and spring seat 58 projects outwardly from the arm 57, the part 58 having a cavity 59 in its inner end, the cavity communicating with a reduced bore 60, extended inwardly through the arm 57.

A slide S is supplied, and includes an outer head 61, an inner head 62, and rod connections 63 joining the heads.

The outer head 61 is disposed between the arm 54 and the guide 58, the head 62 being located inwardly of the arm 57. The rods 63 are mounted for longitudinal sliding movement in the arm 57. The ring or inner head 62 is received in a circumferential groove 64, formed in the hub of the sprocket wheel 48. The sprocket wheel 48, therefore, is connected to the slide S, for rotation therein, and for in and out sliding movement, responsive to the corresponding movement of the slide.

The slide S is constrained to straight line sliding movement, in addition to the support afforded by the rod connections 63 and the arm 57, by means of an inwardly extended finger 65, mounted to reciprocate in the bore 60 of the part 58, the finger being connected to the outer head 61.

The outer head 61 of the slide S is equipped with an outwardly extended finger 66, mounted for reciprocation in the arm 54 of the bracket plate 53, and adapted to be engaged by the lever 55. A compression spring 67 surrounds the inwardly extended finger 65 of the slide S, the outer end of the spring abutting against the head 61, the inner end of the spring abutting against the part 58, within the cavity 59.

Comparing Figs. 3 and 7, when the lever 55 is swung inwardly, the slide S is moved inwardly, against the thrust of the spring 67, the sprocket wheel 48 being moved inwardly until the socket 50 in the hub of the sprocket wheel receives the polygonal portion 46 of the shaft 44.

A driving connection then is established, including the ground wheels 5 of Fig. 1, the axle 4, the sprocket wheels 51, the sprocket chains 52, the sprocket wheels 48, and the shaft 44.

When the lever 55 is released, the spring 67 carries the slide S outwardly, and the socket 50 of the sprocket wheel 48 is disengaged from the polygonal end 45 of the shaft 44, the driving connection between the axle 4 and the shaft 44 being interrupted.

A means is provided for holding the slide S in its inwardly advanced position, with the polygonal end 45 of the shaft 44 received in the socket 50 of the sprocket wheel 48. That means may comprise a pin 68 secured by a flexible element 69 to the platform 2. Referring to Fig. 3, the outer finger 66 of the slide S has a transverse opening 70, and when the slide is thrust inwardly, the pin 68 may be inserted through the opening 70, in contact with the inner surface of the arm 54, as shown in dotted line in Fig. 3.

An approximately semicircular casing 71 is secured to the platform 2 and upstands therefrom, the anchor block 40 of the fixed gear wheel 37 extending outwardly through one side of the casing, as shown in Fig. 3.

The letter R marks a rotor, about one-half of which is received in the casing 71, the rotor extending downwardly through the opening 39 in the platform 2. The rotor R includes an elongated hub 72 (Fig. 3) one end of which extends outwardly through the casing 71, into end engagement with the bearing 42, the opposite end of the hub having abutment against the central portion of the cup-shaped and fixed gear wheel 37. The hub 72 receives, against rotation, the polygonal intermediate portion 46 of the shaft 44, and when rotation is imparted to the shaft, rotation will be imparted to the rotor R also.

The rotor R includes a disk-like body 73, having a transversely projecting rim 74, within which the gear 37 extends. The rim 74 of the rotor R is equipped with inwardly projecting, tubular bearings 75, bushings 76 being mounted in the bearings.

The rim 74 is provided with circumferentially spaced, outwardly extended, radial projections 77, having soil compacting outer-end surfaces. The projections have circumferential passages 78 which widen in opposite directions, the projections having radial openings 79, spaced from the margins of said surfaces and communicating with the passages. Radial shafts 80 are journaled in the bushings 76. Pinions 81 are secured to the inner ends of the shafts 80, and mesh with the teeth 38 of the fixed gear wheel 37.

Cruciform heads 82 are secured to the outer ends of the shafts 80, and carry individually renewable blades 83, held on the heads by securing elements 84 (Fig. 6). The blades 83 and the heads 82 constitute rotary cutters, operating between the projections 77 of the rotor R. The rotary cutters may have more or less cutting parts than the drawings show.

As the vehicle is advanced over the ground, the cotton stalks which are to be left standing are received in the openings 79. The circumferential passages 78 keep the openings 79 clear of trash. When rotation is imparted to the rotor R by the shaft 44 and its polygonal portion 46, the fixed gear wheel 37 rotates the cutters 82—83 by way of the pinions 81, and the shafts 80. The cutters 82—83 sever the cotton plants that are between the projections 77, and, thus, a thinning out of the cotton is effected.

The cultivator elements 33, operating to the rear of the cotton chopping mechanism (Fig. 2) exercise the function which their name indicates.

A description of the operation of the machine has been given hereinbefore, in connection with its constituent mechanisms, but a recapitulation will be given briefly at this place.

The forward end of the vehicle frame F and instrumentalities carried thereby are raised and lowered by manipulating the hand wheel 22, relative vertical movement being produced between the carriage beam 9 of Fig. 5 and the inverted U-shaped standard 6 which is connected to the frame.

The cultivators shown at 33 are raised and lowered by rotating the shaft 29 by means of hand lever 34.

The ground wheels 5 and the sprocket chains 52 rotate the sprocket wheels 48, and the sprocket wheels rotate the shaft 42. The shaft 42 turns the rotor R, and the cutting instrumentalities 82—83 are rotated by way of the shafts 80, the pinions 81 thereon, and the fixed gear wheel 37.

In the device forming the subject matter of this application, there is a double drive for the rotor R, represented by the two sprocket chains 52 and associated parts. An even, satisfactory and forcible rotation thus is imparted to the rotor. If one of the driving instrumentalities breaks down, the other will continue to be useful, although, maximum efficiency is secured only when both of the driving means are capable of operation.

Having thus described the invention, what is claimed is:

A cotton chopper comprising a vehicle including a platform having an opening, and upstanding casing on the platform and located above the opening, an anchor mounted fixedly on the platform, externally of the casing, a fixed gear carried by the anchor and extended into the casing, a bearing on the platform and external to the casing, a transverse shaft journaled in the anchor and in the bearing, means for rotating the shaft, a rotor mounted on the shaft, to rotate therewith, and held against movement longitudinally of the shaft by engagement with the anchor and with the bearing, the lower portion of the rotor extending downwardly through the opening, the upper portion of the rotor being housed in the casing, radial shafts journaled in the rotor, cotton chopping devices secured to the radial shafts and located at the periphery of the rotor, and pinions secured to the inner portions of the shafts and meshing with the gear.

WILLIAM H. CLARK.